(12) United States Patent
Ouyang et al.

(10) Patent No.: US 8,346,271 B2
(45) Date of Patent: Jan. 1, 2013

(54) METHOD FOR IMPLEMENTING A BUSINESS OF COMMUNICATION SERVICE LEVEL BASED ON A USER REQUEST

(75) Inventors: Congxing Ouyang, Xicheng District (CN); Bing Wei, Xicheng District (CN); Qian Du, Xicheng District (CN)

(73) Assignee: China Mobile Communications Corporation, Beijing, Xicheng District (CN)

( * ) Notice: Subject to any disclaimer, the term of this patent is extended or adjusted under 35 U.S.C. 154(b) by 717 days.

(21) Appl. No.: 11/815,697

(22) PCT Filed: Feb. 6, 2006

(86) PCT No.: PCT/CN2006/000203
§ 371 (c)(1),
(2), (4) Date: May 19, 2009

(87) PCT Pub. No.: WO2006/084418
PCT Pub. Date: Aug. 17, 2006

(65) Prior Publication Data
US 2009/0298507 A1    Dec. 3, 2009

(30) Foreign Application Priority Data

Feb. 8, 2005    (CN) .......................... 2005 1 0007721

(51) Int. Cl.
*H04W 72/00* (2009.01)
(52) U.S. Cl. .................. 455/450; 455/452.1; 455/452.2; 455/455; 455/509; 455/511; 455/512; 455/516
(58) Field of Classification Search .............. 455/450, 455/452.1, 452.2, 455, 509, 511, 512, 516
See application file for complete search history.

(56) References Cited

U.S. PATENT DOCUMENTS 5,153,877 A * 10/1992 Esaki et al. .................. 370/389
6,779,020 B1 * 8/2004 Henrick .......................... 709/206

FOREIGN PATENT DOCUMENTS

JP    2000316025    11/2000
WO    WO 01/35680 A1    5/2001
WO    WO 03/047186 A1    5/2003

OTHER PUBLICATIONS

Publication: International Search Report for International Application No. PCT/CN2006/000203 filed Feb. 6, 2006, International Publication No. WO 2006/084418 A1 published Aug. 17, 2006 of China Mobile Communications Corporation pertains to a Method for Implementing Class of the Communication Service Based on the User Request.

* cited by examiner

*Primary Examiner* — Jinsong Hu
*Assistant Examiner* — Qun Shen
(74) *Attorney, Agent, or Firm* — Workman Nydegger

(57) ABSTRACT

The present invention relates a method for implementing a business of communication service level based on a user request. A calling user initiates a call request at least including the user's requirement information for the current communication service level; a network equipment receives the call request, detects the requirement information for the current communication service level in the call request, determines whether the user-network interface on the calling side has the capability of providing the communication service level; if yes, the network equipment analyzes the requirement information for the current communication service level and the utilization status of the network resources, obtains the strategy information relevant to the communication service level of the current call; said network equipment allocates user-network resources for the calling side according to the relevant strategy information and then the calling terminal and the called terminal establish call connection; if no, it doesn't respond to the requirement information for the current communication service level. The present invention implements the different requirements for the communication service level by the call request as the same calling user under different circumstances. It's convenient and simple to operate.

13 Claims, 6 Drawing Sheets

METHOD FOR IMPLEMENTING A BUSINESS OF COMMUNICATION SERVICE LEVEL BASED ON A USER REQUEST

CROSS REFERENCES TO RELATED APPLICATIONS

This application is a national phase application based upon priority International PCT Patent Application No. PCT/CN2006/000203 filed Feb. 6, 2006, International Publication No. WO 2006/084418 A1 published Aug. 17, 2006, which is based upon priority Chinese Patent Application No. 200510007721.6 filed Feb. 8, 2005.

FIELD OF THE INVENTION

The present invention relates to a method for implementing a business of communication service level, especially relates to the method for implementing a business of communication service level based on a user request.

BACKGROUND OF THE INVENTION

Currently, there are generally two methods of providing the business of communication service level for users: one is implementing the business of communication service level based on the user category; the other is implementing the business of communication service level based on that the calling user additionally dials the access number prefix.

Regarding the first method, the operator classifies the mobile users in the mobile communication networks such as GSM. Each user category corresponds to a certain level of priority. The corresponding user category is set into the User Data Management System by the operation of the Customer Service System (or, the Business Operation Supporting System). The equipment of the Core Network or the Switch Network acquires the mobile user's user category from the User Data Management System during the process of the Mobility Management to the user. When the mobile communication network provides the communication services for the mobile user as calling service or called service, the equipment of the Core Network or the Switch Network comprehensively analyzes the user category of the mobile user and the support capability of the currently used mobile terminal, and then informs the equipments of the Wireless Access Network of the relevant information of the communication service level (such as the channel type, encoding rate and so on) corresponding to the user. According to the principle that allocating different ways of channel encoding for different priority levels, in high-load condition, the equipment of the Wireless Access Network will still allocate corresponding mobile network resources according to the relevant information of the user's communication service level. For high-level users, even in the situation of the Wireless Access Network resources strain, the mobile communication network will also provide priority for wireless access business with high-speed coding rate. The flowchart of this method is shown as FIG. 1.

Although this method can implement providing the business of communication service level for users, shortcomings are still exists. After a user is set to be a certain user category, when he is on calling as the calling party or the called party, the communication can only be conducted according to the communication service level corresponding to the user category. However, for the user, calls with different communication service levels are needed under different circumstances. If the user category is to be changed, the operation by the Customer Service System or the Business Operation Supporting System should be conducted in the User Data Management System. The communication service level can't be real-timely set according the user's need or aiming at each call.

Regarding the second method, the operator sets some special access numbers. The calling user can choose whether to dial the above access number as the called number's prefix when he dials the called number. As shown in FIG. 2, if the calling user doesn't additionally dial the above access number prefix before he dials the called number, the network equipment on the calling side will continually connect this call to the TDM Carrier-based communication network (or called Circuit-Switched Network) when it receives the call request of the calling user. For this call, the communication service network between the network equipment on the calling side and the called side is the Circuit-Switched Network; if the calling user additionally dials the above access number prefix before he dials the called number, it will continually connect this call to the Packet Network Carrier-based (IP network or ATM network and so on) communication network corresponding to the access number prefix dialed by the calling user after the network equipment on the calling side receives the call request of the calling user. For this call, the communication service network between the network equipment on the calling side and the called side is the Packet Network Carrier-based communication network.

For the situation that there are several Packet Network Carrier-based communication networks which can provide services between the equipment on the calling side network and that on the called side network, the operator will correspondingly set multiple access number prefixes. After receiving the call request of the calling user, the equipment on the calling side network continually connects this call to the Packet Network Carrier-based communication network corresponding to the access number prefix currently dialed by the calling user.

By detecting whether the access number prefix is additionally dialed in the called number dialed by the calling user and which access number prefix is dialed, the equipment on the calling side accordingly chooses the communication service network between it and, the equipment on the called side network. As different communications service networks may have different communication service qualities, the calling user can choose the communication service level for this call by different ways of dialing (such as whether additionally dialing an access number prefix before dialing the called number or which access number prefix to dial additionally and so on).

However, this method also has its shortcomings. For the situation that communication services between the equipment on the calling side network and the called side network are provided by the same communication network, according to this method, the calling user can't choose the communication service network for this call by different ways of dialing (whether the access number prefix is additionally dialed before the called number dialed by the calling user and which access number prefix is dialed) so that the communication service level for this call can't be chosen by different ways of dialing.

For the situation that the communication services between the calling terminal and the equipment on the calling side network are provided by only one communication network and the situation that communication services between the called terminal and the equipment on the called side network are provided by only one communication network, according to this method, the calling user can't choose for this call the communication service network between the calling terminal and the network equipment on the calling side or between the called terminal and the network equipment on the called side by different ways of dialing, so that by different ways of dialing, the communication service level on the calling side, and on the called side can't be chosen for this call.

SUMMARY OF THE INVENTION

The purpose of the present invention is that, regarding to the shortcomings of the prior art, to provide a method for implementing a business of communication service level based on a user request which is used to meet the different requirements of the calling user for the communication service level under different calling circumstances, when the calling terminal and the called terminal belong to the same network or belong to different networks.

In order to realize the above purpose, the present invention provides a method for implementing the business of communication service level based on the user request. When the related calling terminal and the called terminal belong to the same network, the method includes the following steps:

step 1, a calling user initiates a call request, which at least includes the requirement information for a current communication service level of the user;

step 2, a network equipment receives the call request, detects the requirement information for the current communication service level in the call request, determines whether a user-network interface on the calling side has the capability of providing the communication service level; if yes, the network equipment comprehensively analyzes the requirement information for the current communication service level and the utilization status of the network resources, obtains the strategy information relevant to the communication service level of the current call according to the analysis result and the step 4 is executed; if no, the step 3 is executed;

step 3, the network equipment doesn't respond to the requirement information for the current communication service level, and the step 5 is executed;

step 4, the network equipment allocates a user-network resource for the calling side according to the strategy information relevant to the communication service level of the current call, and the next step is executed;

step 5, the calling terminal and the called terminal establish a call connection according to the allocated network resource.

Wherein, the step 3 specifically includes the following steps:

step 3a, the network equipment determines whether the user-network interface on the called side has the capability of providing the communication service level; if yes, the network equipment comprehensively analyzes the requirement information for the current communication service level and the utilization status of the network resources, obtains the strategy information relevant to the communication service level of the current call according to the analysis result and the next step is executed; if no, the network equipment doesn't respond to the requirement information for the current communication service level, and the step 5 is executed;

step 3b, the network equipment allocates a user-network resource for the called side according to the strategy information relevant to the communication service level of the current call, and the step 5 is executed.

When the network equipments are divided into the network equipment on the calling side and the network equipment on the called side, the network equipment in the steps 2, 3 and 4 is the network equipment on the calling side, the network equipment in the steps 3a, 3b is the network equipment on the called side, before said step 3a further including the following steps:

step a, the network equipment on the calling side determines whether the network-network interface between the calling side network and the called side network has the interoperability for the business of communication service level; if yes, the network equipment on the calling side comprehensively analyzes the requirement information for the current communication service level and the utilization status of the network resources, obtains the strategy information relevant to the communication service level of the current call according to the analysis result, executes the next step and sends the requirement information for the current communication service level to the network equipment on the called side; if no, the step 5 or the step 3a is executed;

step b, the network equipment on the calling side allocates a network-network resource according to the strategy information relevant to the communication service level of the current call, and the step 5 or the step 3a is executed.

When the related calling terminal and the called terminal belong to different networks, the method for implementing a business of communication service level based on a user request includes the following steps:

step 10, a calling user initiates a call request; the call request at least includes the requirement information for the current communication service level of the user;

step 20, the network equipment on the calling side receives the call request, detects the requirement information for the current communication service level in the call request, determines whether the user-network interface on the calling side has the capability of providing the communication service level; if yes, the network equipment on the calling side comprehensively analyzes the requirement information for the current communication service level and the utilization status of the network resources, obtains the strategy information relevant to the communication service level of the current call according to the analysis result;

step 30, if no, the network equipment on the calling side doesn't respond to the requirement information for the current communication service level, and the step 50 is executed;

step 40, the network equipment on the calling side allocates a user-network resource according to the strategy information relevant to the communication service level of the current call, and the nest step is executed;

step 50, the calling terminal and the called terminal establish a call connection according to the allocated network resource.

Wherein, the step 30 includes following steps:

step 30a, the network equipment on the calling side determines whether the network-network interface between the calling side network and the called side network has a interoperability for the business of communication service level; if yes, the network equipment on the calling side comprehensively analyzes the requirement information for the current communication service level and the utilization status of the network resources, obtains the strategy information relevant to the communication service level of the current call according to the analysis result, executes the next step and sends the requirement information for the current communication service level to the network equipment on the called side; if no, the network equipment doesn't respond to the requirement information for the current communication service level, and the step 50 is executed;

step 30b, the network equipment on the calling side allocates a network-network resource according to the strategy information relevant to the communication service level of the current call, and the step 50 is executed.

Further more, in the step 30a before the network equipment on the calling side determines that the network-network interface between the calling side network and the called side network hasn't the interoperability for the business of communication service level and/or in the step 30b before the step 50 is executed, the following steps are included:

step a, the network equipment on the called side determines whether the user-network interface on the called side has the capability of providing the communication service level; if yes, the network equipment on the called side comprehensively analyzes the requirement information for the current communication service level and the utilization status of the network resources, obtains the strategy information relevant to the communication service level of the current call according to the analysis result and the next step is executed; if no, the network equipment doesn't respond to the requirement information for the current communication service level, and the step 50 is executed;

step b, the network equipment on the called side allocates a user-network resource for the called side according to the strategy information relevant to the communication service level of the current call, and the step 50 is executed.

The way of reporting of the requirement information for the current communication service level of the user in the call request initiated by the calling user is: additionally dialing the access number prefix or by the interface signaling on the user-network interface.

The present invention implements that when the communication service between the calling terminal and the calling side network equipment is provided by one communication network, or the communication service between the called terminal and the called side network equipment is provided by one communication network, or the communication service between the network equipment on the calling side and the network equipment on the called side is also provided by one communication network, i.e. no matter whether the calling terminal and the called terminal belong to one or different networks, by allocating user-network resources for the calling side or the called side, or by allocating the network-network resources between the network equipment on the calling side and that on the called side, the different requirements for the communication service level could be met by the call request of the user as the same calling user under different calling circumstances. It's convenient and simple to operate.

DETAILED DESCRIPTION OF THE INVENTION

The present invention will be described in detail by the following drawings and preferred embodiments.

Figure 1:
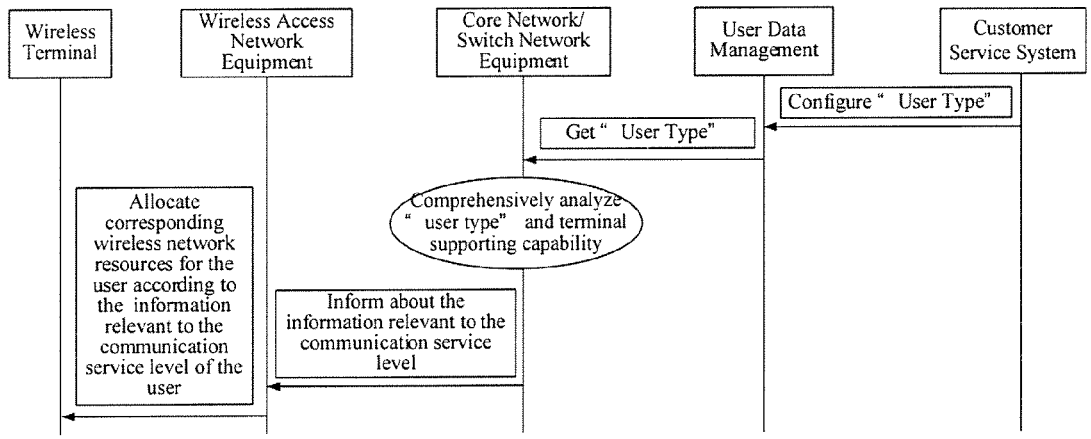
FIG. 1 is a flowchart of the prior art.
Figure 2:
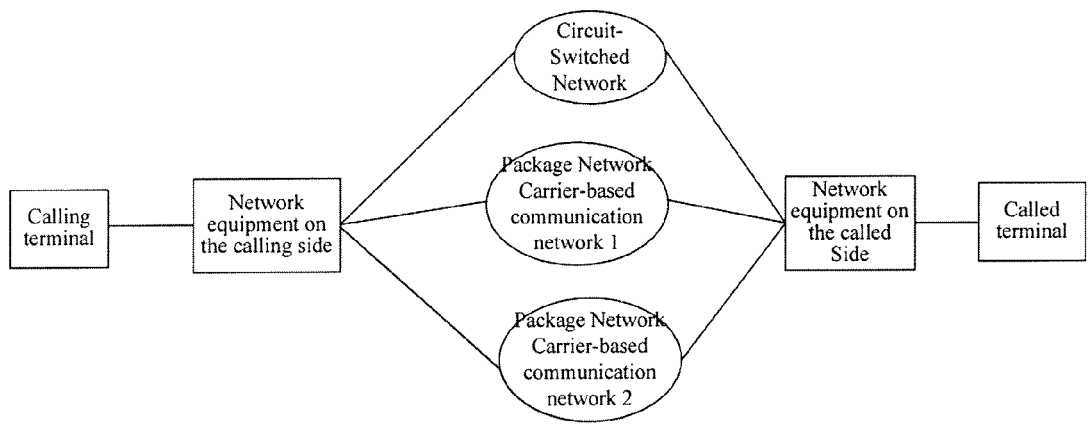
FIG. 2 is another flowchart of the prior art.
Figure 3:
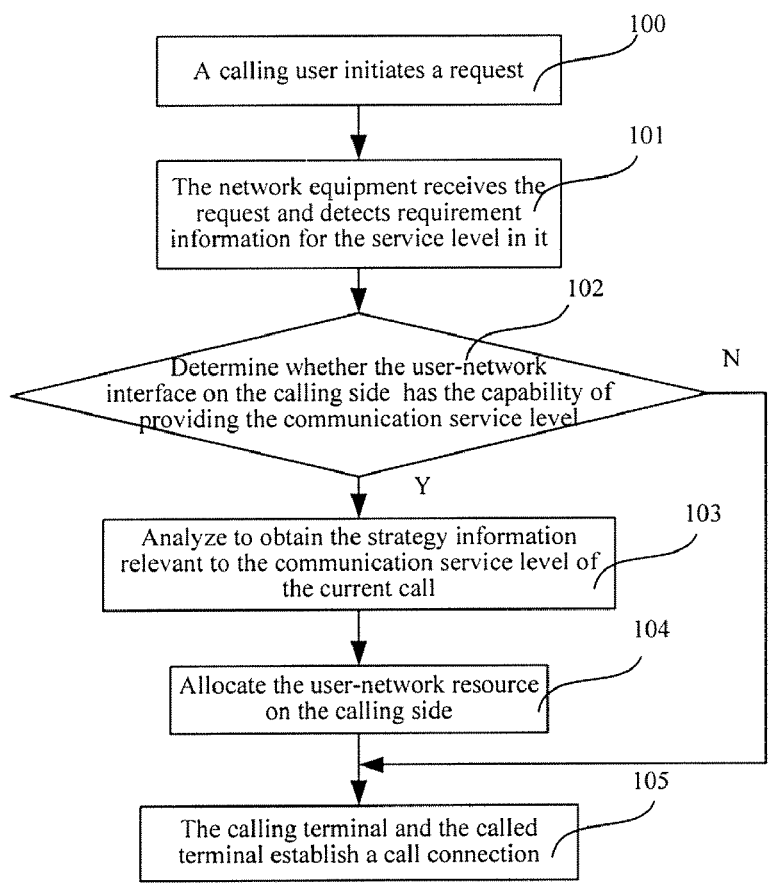
FIG. 3 is a flowchart of the first embodiment of the present invention.

In the present invention, when the calling terminal and the called terminal belong to the same network, for the calling side and the called side, the network equipment on the calling side and that on the called side could be the same one or be different ones. The first embodiment in the condition of the network equipments are the same can be referred to FIG. 3.

Step 100, a calling user initiates a call request at least including the requirement information for the current communication service level of the user;

Step 101, a network equipment receives this call request, detects the requirement information for the current communication service level in the call request;

Step 102, the network equipment determines whether the user-network interface on the calling side has the capability of providing the communication service level; if yes, the step 103 is executed; if no, the network equipment doesn't respond to the requirement information for the current communication service level and the step 105 is executed;

Step 103, the network equipment comprehensively analyzes the requirement information for the current communication service level and the utilization status of the network resources, obtains the strategy information relevant to the communication service level corresponding to the current call according to the analysis result, and then the next step is executed;

Step 104, the network equipment allocates a user-network resource for the calling side according to the strategy information relevant to the communication service level of the current call and the next step is executed;

Step 105, the calling terminal and the called terminal establish a call connection according to the allocated network resources.

There are two implementation ways for the calling terminal to report the calling user's requirement for the current communication service level:

The first way of reporting the requirement for current communication service level is the way of additionally dialing the access number prefix:

When the calling user is dialing the called number, by choosing whether to additionally dial the access number prefix and which access number prefix to dial, the requirement for the current communication service level can be correspondingly reported.

There are two implementation means of additionally dialing the access number prefix:

The first implementation means: If the calling user is going to dial the access number prefix, he manually inputs the access number prefix one by one before dialing the called number when initiating each call.

The second implementation means: a menu or a button which can be used to configure the communication service level could be set on the terminal. The user can configure the current communication service level by the menu or the button. After the configuration, when the calling user initiates a call each time, whether it's needed to additionally dial the access number prefix, and which access number prefix will be dialed are all determined by the terminal according to the user's configuration to the current communication service level. If the current communication service level configured by the calling user needs the access number prefix to be dialed, the terminal automatically dials it. If the user needs to change the requirement for the current communication service level, the user can reconfigure the current communication service level by the menu or the button on the terminal.

The second way of reporting the requirement for the current communication service level is the way of reporting by the interface signaling on the user-network interface.

A menu or a button which can be used to configure the communication service level could be set on the terminal. The user can configure the current communication service level by the menu or the button. After the first configuration, or after each change of the configuration, the terminal reports the user requirement for the current communication service level to the network equipment on the calling side by the interface signaling on the user-network interface. The requirement for the current communication service level of the calling user is indicated by the parameter values of the interface signaling on the user-network interface.

The aforementioned strategy information relevant to the communication service level of the current call, which is used to allocate resources for the current call, includes the call acceptance priority, or the encoding rate of voice or video media, or the transmission priority of communication packet, or discarding order, or any combination of the above information.

Figure 4:
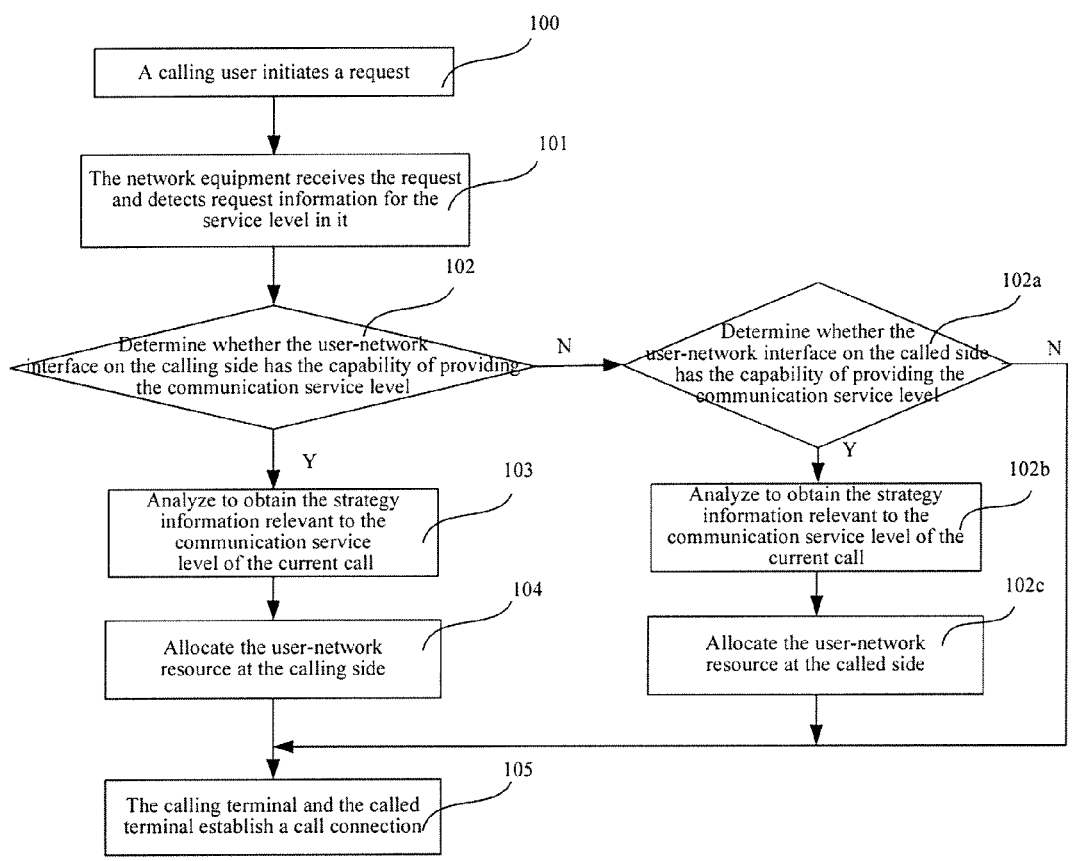
FIG. 4 is a flowchart of the second embodiment of the present invention.

Moreover, when it is determined that the user-network interface on the calling side does not have the capability of providing the communication service level, before the step 105 is executed, it could also to be determined whether the user-network interface on the called side has the capability of providing the communication service level. Such is specifically described as the second embodiment with its flowchart as shown in FIG. 4. The difference between the second embodiment to the first embodiment is that the following steps are added:

Step 102*a*, the network equipment determines whether the user-network interface on the called side has the capability of providing the communication service level, if yes, the step 102*b* is executed; if no, the network equipment doesn't respond to the requirement information for the current communication service level and the step 105 is executed;

Step 102*b*, the network equipment comprehensively analyzes the requirement information for the current communication service level and the utilization status of the network resources, and obtains the strategy information relevant to the communication service level of the current call according to the analysis result, and the next step is executed;

Step 102*c*, the network equipment allocates the user-network resources for the calling side according to the strategy information relevant to the communication service level of the current call, and the step 105 is executed.

Figure 5:
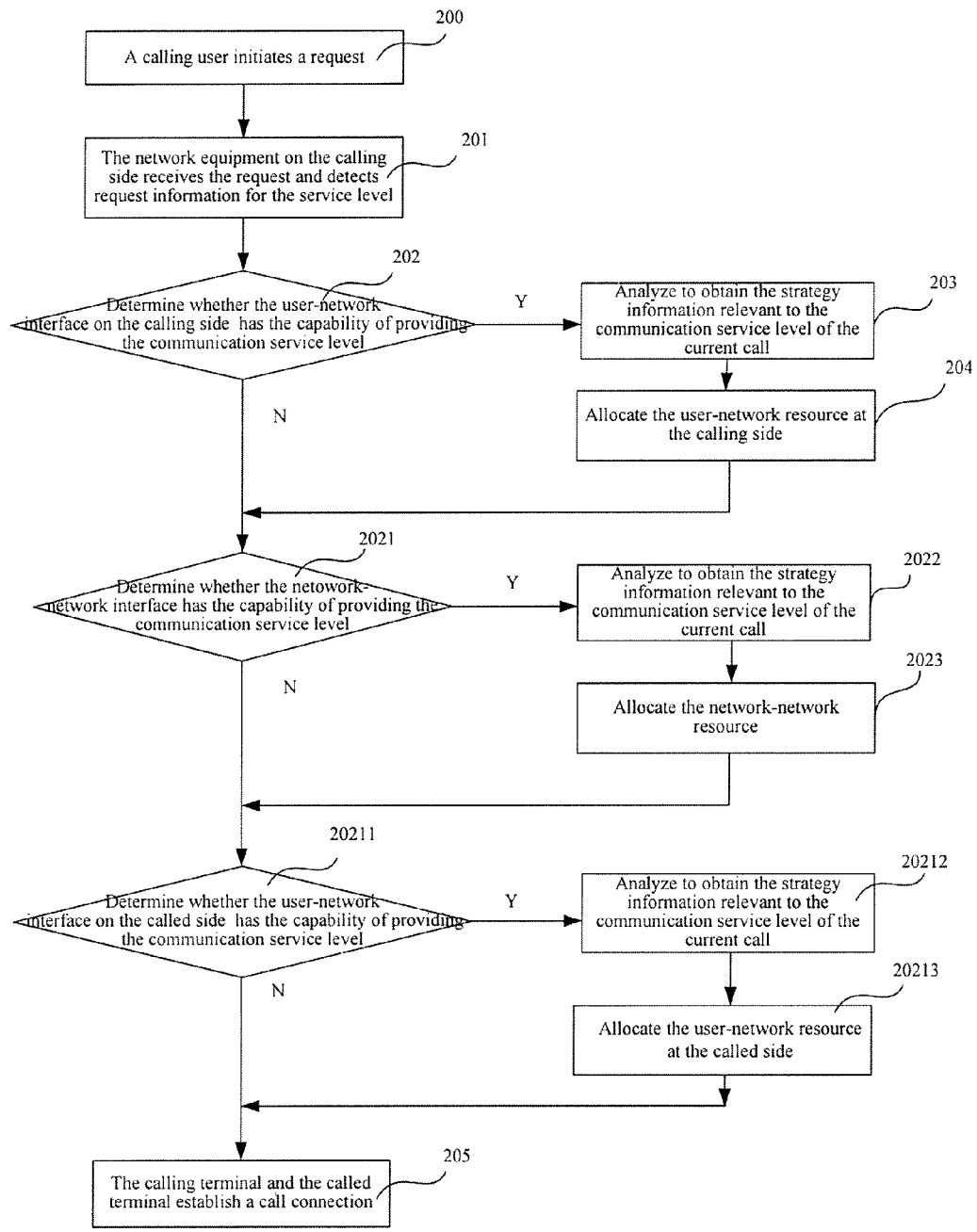
FIG. 5 is a flowchart of the third embodiment of the present invention.

When the network equipments are different ones, i.e. they are the network equipment on the calling side and the network equipment on the called side respectively, the flowchart of the third embodiment is shown as FIG. 5:

Step 200, a calling user initiates a call request at least including the user's requirement information for the current communication service level;

Step 201, the network equipment on the calling side receives this call request, and detects the requirement information for the current communication service level in the call request;

Step 202, it is determined whether the user-network interface on the calling side has the capability of providing the communication service level, if yes, the step 203 is executed; if no, the step 2021 or the step 205 is executed;

Step 203, the requirement information for the current communication service level and the utilization status of the network resources are comprehensively analyzed, and the strategy information relevant to the communication service level of the current call is obtained according to the analysis result, and the next step is executed;

Step 204, the network equipment on the calling side allocates the user-network resources for the calling side according to the strategy information relevant to the communication service level of the current call, and the step 2021 or the step 205 is executed;

Step 2021, the network equipment on the calling side determines whether the network-network interface between the calling side network and the called side network has the interoperability for the business of communication service level, if yes, the step 2022 is executed, and the requirement information for the current communication service level is sent to the network equipment on the called side; if no, the step 20211 or the step 205 is executed;

Step 2022, the network equipment on the calling side comprehensively analyzes the requirement information for the communication service level of the current call and the utilization status of the network resources, obtains the strategy information relevant to the communication service level of the current call according to the analysis result;

Step 2023, the network equipment on the calling side allocates a network-network resource according to the strategy information relevant to the communication service level of the current call, and the step 20211 or the step 205 is executed;

Step 20211, the network equipment on the called side determines whether the called side user-network interface has the capability of providing the communication service level, if yes, the step 20212 is executed; if no, the step 205 is executed;

Step 20212, the network equipment on the called side comprehensively analyzes the requirement information for the current communication service level and the utilization status of the network resources, and obtains the strategy information relevant to the communication service level of the current call according to the analysis result;

Step 20213, the network equipment on the called side allocates the user-network resources for the called side according to the strategy information relevant to the communication service level of the current call, and the step 205 is executed;

Step 205, the calling terminal and the called terminal establish the call connection according to the allocated network resources.

In the abovementioned procedures, the determination can be done only in the step 202, or in the steps 202 and 2021, or in the steps 202, 2021 and 20211, which depends on the network's situation.

When the related calling terminal and the called terminal belong to different networks, there are calling side equipment on the calling side and called side equipment on the called side. The present invention is described in detail by taking the Wireless Access Network and the Packet Network Carrier-based communication network as examples.

Figure 6:
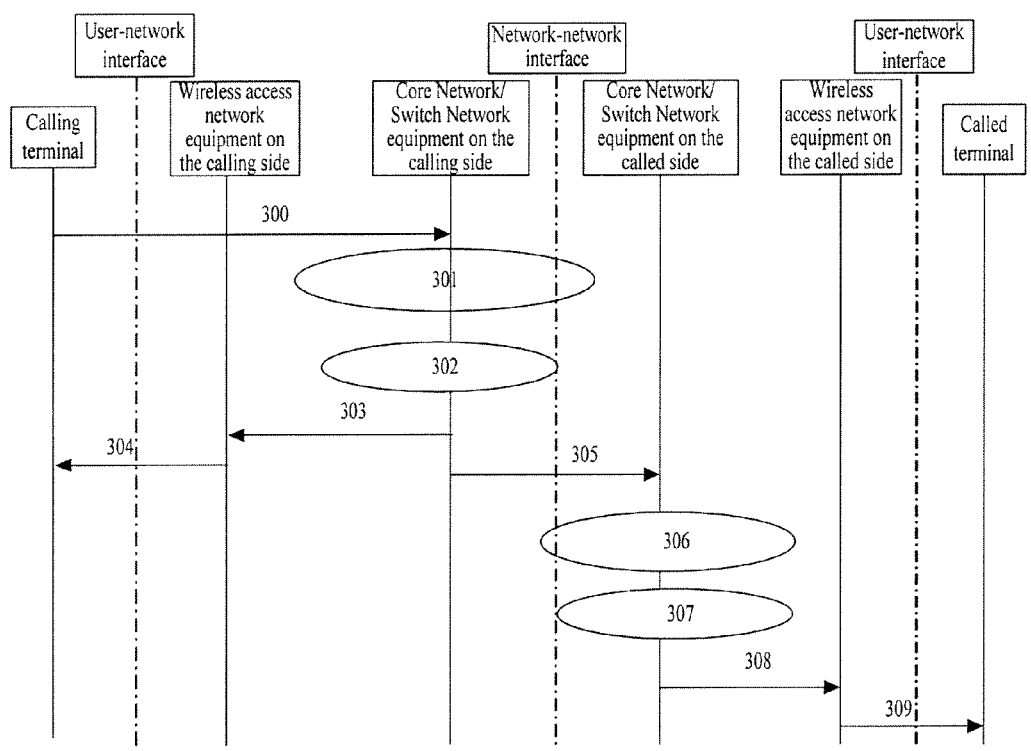
FIG. 6 is a flowchart of implementing the present invention to the Wireless Access Network.

As shown in FIG. 6, it is the flowchart of implementing the fourth embodiment of the present invention to the Wireless Access Network. In the Wireless Access Network, the calling terminal communicates with the Wireless Access Network equipment on the calling side by the user-network interface, and the Wireless Access Network equipment on the calling side wirelessly communicates with the Core Network/Switch Network equipment on the calling side, and the Core Network/Switch Network equipment on the calling side communicates with the Core Network/Switch Network equipment on the called side by the network-network interface, and the Core Network/Switch Network equipment on the called side wirelessly communicates with the Wireless Access Network equipment on the called side, and the Wireless Access Network equipment at the called side communicates with the called terminal by the user-network interface.

The method of the present invention is completed by the following steps:

Step 300, a calling user initiates a call request which at least includes the user's requirement information for the current communication service level to the Core Network/Switch Network equipment on the calling side;

Step 301, the Core Network/Switch Network equipment on the calling side receives the call request and detects the requirement information for the current communication service level in the call request;

Step 302, the calling user's requirement information for the current communication service level, the utilization status of the network resources and the calling terminal's support capability are comprehensively analyzed, and the strategy information relevant to the communication service level of the current call is obtained;

Step 303, if the calling side has the capability of providing the communication service level, the Core Network/Switch Network equipment on the calling side informs the Wireless Access Network equipment on the calling side about the strategy information relevant to the communication service level of the current call;

Step 304, the Wireless Access Network equipment on the calling side allocates corresponding network resource for the current call of the calling terminal according to the strategy information relevant to the communication service level of the current call;

Step 305, the Core Network/Switch Network equipment on the calling side informs the Core Network/Switch Network equipment on the called side about the current call's requirement information for the communication service level, and sends the call connection instruction at the same time;

Step 306, the Core Network/Switch Network equipment on the called side detects the requirement information for the current communication service level;

Step 307, the requirement information of the calling user for the current communication service level, the utilization status of the network resources and the called terminal's support capability are comprehensively analyzed, and the strategy information relevant to the communication service level of the current calling is obtained;

Step 308, if the called side has the capability of providing the communication service level, the Core Network/Switch Network equipment on the called side sends the strategy information relevant to the communication service level of the current call to the Wireless Access Network equipment on the called side;

Step 309, the Wireless Access Network equipment on the called side allocates corresponding network resource for the called terminal according to the strategy information relevant to the communication service level of the current call.

The calling connection is established by above steps.

Moreover, in the step 302, if it is concluded by analysis that the calling terminal does not have the capability of supporting the communication service level, the network equipment on the calling side determines whether the network-network interface between the calling side network and the called side network has the interoperability of the business of communication service level, if yes, the network equipment on the calling side comprehensively analyzes the requirement information for the current communication service level and the utilization status of the network resources, obtains the strategy information relevant to the communication service level of the current call according to the analysis result and sends the requirement information for the current communication service level to the network equipment on the called side; the network equipment on the calling side allocates network resource according to the strategy information relevant to the communication service level of the current call.

There are two implementation ways for the calling terminal to report the calling user's requirement of the current communication service level. These two implementation ways are the same as the first, second and third embodiments so that they will not be repeated.

Moreover, there are two ways for the Core Network/Switch Network equipment on the calling side informing the Core Network/Switch Network equipment on the called side about the requirement information for the current call's communication service level:

Way 1: the way of adding the access number prefix before the called number.

When transmitting the called number to the network equipment on the called side, the network equipment on the calling adds an access number prefix before the called number or adds a certain access number prefix to correspondingly inform the equipment on the called side about the requirement information for the communication service level of the current call.

Way 2: the way of informing by the interface signaling on the network-network interface.

In the process of call connection, the network equipment on the calling side informs the network equipment on the called side about the communication service level of the current call by the interface signaling on the network-network interface.

The communication service level of the current call is indicated by the parameter values of the interface signaling on the network-network interface.

It can be seen from the embodiments that as long as the calling user sends the information about the communication service level of the current call by the calling terminal, the network equipment of the network which the calling user belongs to can allocate corresponding network resources for the calling user according to the status of the current network resources and the support capability of the calling terminal and the called terminal so as to implement business of different communication service levels. And the calling user can choose when on which level according to its own need. It's flexible to operate.

Figure 7:
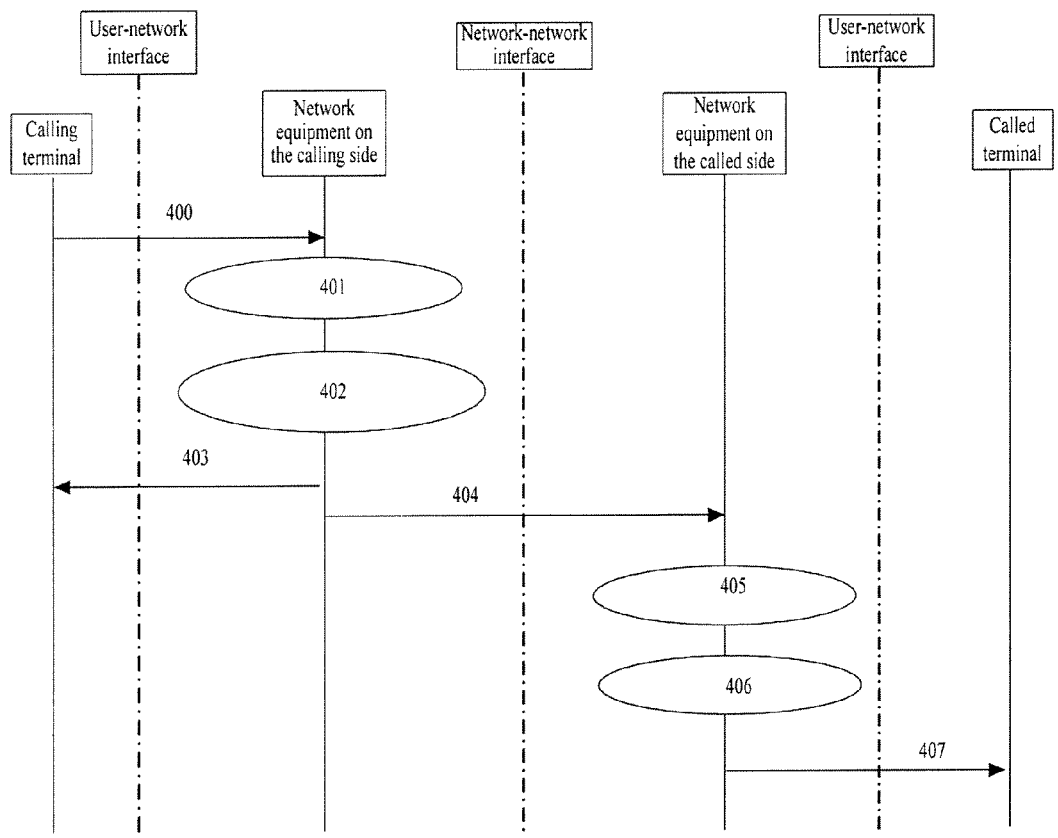
FIG. 7 is a flowchart of implementing the present invention to the Packet Network Carrier-based communication network.

As shown in FIG. 7, it is the flowchart of the fifth embodiment which applies the present invention to the Packet Network Carrier-based communication network.

The present embodiment is aiming at the application situation of Packet Network-based communication network, such as the communication network carried by IP network or ATM Network. The calling terminal communicates with the network equipment on the calling side by the user-network interface. The network equipment on the calling side communicates with the network equipment on the called side by the network-network interface. The network equipment on the called side communicates with the called terminal by the user-network interface. The specific process of the method according to the present invention is as following:

Step 400, a calling user initiates a call request to the network equipment on the calling side; the call request at least includes the user's requirement information for the current communication service level;

Step 401, the network equipment on the calling side receives the call request, detects the requirement information for the current communication service level in the call request, and determines whether the user-network interface on the calling side has the capability of providing communication service level; if no, the next step is executed;

Step 402, the requirement information for the current communication service level of the calling user and the utilization status of the network resources are comprehensively analyzed, and the strategy information relevant to the communication service level of the current call is obtained;

Step 403, the corresponding user-network network resources is allocated to the calling side according to the strategy information relevant to the communication service level of the current call;

Step 404, the network equipment on the calling side informs the network equipment on the called side about the requirement information for the communication service level of the current call, and sends the call connection instruction at the same time;

Step 405, the network equipment on the called side detects the requirement information for the current communication service level, determines whether the user-network interface on the called side has the capability of providing the communication service level, if yes, the next step is executed;

Step 406, the requirement of the calling user for the current communication service level and the utilization status of the network resources are comprehensively analyzed, and the strategy information relevant to the communication service level of the current call is obtained;

Step 407, the network equipment on the called side allocates corresponding user-network resource for the called side according to the strategy information relevant to the communication service level of the current call.

After above steps, the calling terminal and the called terminal establish call connection.

In the step 40, when determining whether the user-network interface on the calling side has the capability of providing the communication service level, if no, two kinds of flows can be executed. One of the flows is not to execute the steps 402 and 403 any more, but to directly execute the step 404; the other one of the flows is to continuously determine whether the network-network interface between the calling side network and the called side network has the interoperability of the business of communication service level; if yes, the requirement information for the current communication service level and the utilization status of the network resources are comprehensively analyzed and the strategy information relevant to the current call's communication service level of the current call is obtained according to the analysis result; the network equipment on the calling side allocates the network-network resources according to the strategy information relevant to the communication service level of the current call, and then the step 404 is executed; if no, the network equipment on the calling side don't respond to the requirement information for the current communication service level, or, execute the step 404.

Moreover, the way of the calling terminal reporting the calling user's requirement for the current communication service level is same as the aforementioned first, second and third embodiments so that it will not be repeated.

The way that the network equipment on the calling side informs the communication service level of the current call to the network equipment on the called side is same as the fourth embodiment so it won't be repeated here.

By the analysis of above technical solution, it can be known that, for various network having the capability of the communication service level, the method of the present invention can be widely applied. For example:

1. Application to IP Soft-Switch Tandem Network

By additionally dialing different long-distance access numbers, the calling user can choose the communication service level of the long-distance call; the method can be applied to BICC (Bearer Independent Call Control) Protocol-Based IP Soft-Switch Tandem Network, as well as SIP/SIP-T Protocol-Based IP Soft-Switch Tandem Network.

2. Application to Fixed IP Soft-Switch Network/Fixed NGN(Next Generation Network)

By additionally dialing different business access number or by the user side equipment in NGN configuring different service level signs, the calling user can choose the level of VoIP (Voice over IP) communication service, i.e. the method can be applied to the Fixed IP Soft-Switch Network accessed through SIP Protocol or H248 Protocol.

3. Application to 3GPP (The 3rd Generation Partnership Project) IMS (IP Multimedia Sub-System)

By additionally dialing different business access number or by the IMS terminal configuring different service level signs, the calling user can choose the service level of this SIP (Session Initiation Protocol) communication.

4. Application to GSM or WCDMA (Wideband Code Division Multiple Access) or CDMA (Code Division Multiple Access) or WiFi call or WiMax (Worldwide Interoperability for Microwave Access) call for different call level. By additionally dialing different business access number or by CDMA terminal, WCDMA terminal, WiFi terminal or WiMax terminal configuring different current service level signs, the calling user can choose the communication service level of CDMA call, WCDMA call, WiFi call or WiMax call.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for implementing a business of communication service level based on a calling user request, wherein a related calling terminal and a related called terminal belong to a same network, characterized in that said method includes the following steps:

step 1, a calling user initiates a call request, the call request at least includes requirement information for a current communication service level of the user;

step 2, a network equipment receives the call request, detects the requirement information for the current communication service level in the call request, determines whether a user-network interface on the calling side has a capability of providing the communication service level; if yes, the network equipment analyzes the requirement information for the current communication service level and utilization status of the network resources and obtains strategy information relevant to the communication service level of the current call according to the analysis result, and the step 4 is executed; if no, the next step is executed, wherein said strategy information relevant to the communication service level of the current call includes a calling acceptance priority, or an encoding rate of voice or video media, or a transmission priority of communication packets, or a discarding order, or any combination of above information;

step 3, the network equipment doesn't respond to the requirement information for the current communication service level, and the step 5 is executed;

step 4, the network equipment allocates a user-network resource for the calling side according to the strategy information relevant to the communication service level of the current call, and the next step is executed;

step 5, the calling terminal and the called terminal establish a call connection according to the allocated network resource;

wherein a way of reporting the user's requirement information for the current communication service level in the call request initiated by said calling user is additionally dialing an access number prefix before a called number, or a way of reporting the user's requirement information for the current communication service level in the call request initiated by said calling user is that the user configures the current communication service level by a menu or a button which is set on the terminal and can be used to configure the communication service level, and the terminal reports the requirement information for the current communication service level to the network equipment by an interface signaling on the user-network interface after the first configuration or the change of the current configuration.

2. The method for implementing a business of communication service level based on a calling user request according to claim 1, characterized in that said step 3 includes the following steps:

step 3a, the network equipment determines whether the user-network interface on the called side has the capability of providing the communication service level; if yes, the network equipment analyzes the requirement information for the current communication service level and the utilization status of the network resources, and obtains the strategy information relevant to the communication service level of the current call according to the analysis result, and the step 3b is executed; if no, the network equipment doesn't respond to the requirement information for the current communication service level, and the step 5 is executed;

step 3b, the network equipment allocates a user-network resource for the called side according to the strategy information relevant to the communication service level of the current call, and the step 5 is executed.

3. The method for implementing a business of communication service level based on a calling user request according to claim 2, characterized in that the network equipment includes a network equipment on the calling side and a network equipment on the called side; the network equipment in said steps 2, 3 and 4 is the network equipment on the calling side, the network equipment in said steps 3a and 3b is the network equipment on the called sides; and the method further includes the following steps before said step 3a:

step a, the network equipment on the calling side determines whether a network-network interface between the calling side network and the called side network has an interoperability for the business of communication service level; if yes, the network equipment on the calling side analyzes the requirement information for the current communication service level and the utilization status of the network resources, obtains the strategy information relevant to the communication service level of the current call according to the analysis result, executes the next step and sends the requirement information for the current communication service level to the network equipment on the called side; if no, the step 5 or the step 3a is executed;

step b, the network equipment on the calling side allocates a network-network resource according to the strategy information relevant to the communication service level of the current call, and the step 5 or the step 3a is executed.

4. The method for implementing a business of communication service level based on a calling user request according to claim 1, characterized in that said way of additionally dialing an access number prefix is that the calling user manually inputs the access number prefix one by one before the called number when initiating the call each time.

5. The method for implementing a business of communication service level based on a calling user request according to claim 1, characterized in that said way of additionally dialing an access number prefix is that the user configures the access number needed to be additionally dialed by using a menu or a button which is set on the terminal and can be used to configure the communication service level; when the calling user initiates the call request, the calling terminal detects the configuration of the communication service level; if the configuration needs additionally dialing the access number prefix, then the number prefix is automatically added before the called number when the calling terminal sends the called number.

6. The method for implementing a business of communication service level based on a calling user request according to claim 1, characterized in that the requirement information for the communication service level of the current call is a parameter value in the interface signaling.

7. A method for implementing a business of communication service level based on a calling user request, wherein a related calling terminal and a called terminal belong to different networks, said method characterized in that it includes the following steps:

step 1, a calling user initiates a call request; the call request at least includes the requirement information for a current communication service level of the user;

step 2, a network equipment on the calling side receives the call request, detects the requirement information for the current communication service level in the call request, determines whether a user-network interface on the calling side has a capability of providing the communication service level; if yes, the network equipment on the calling side analyzes the requirement information for the current communication service level and the utilization status of the network resources, obtains strategy information relevant to the communication service level of the current call according to the analysis result and the step 4 is executed; if no, the step 3 is executed, wherein said strategy information relevant to the communication service level of the current call includes a calling acceptance priority, or an encoding rate of voice or video media, or a transmission priority of communication packets, or a discarding order, or any combination of above information;

step 3, the network equipment on the calling side doesn't respond to the requirement information for the current communication service level, and the step 5 is executed;

step 4, the network equipment on the calling side allocates a user-network resource according to the strategy information relevant to the communication service level of the current call;

step 5, the calling terminal and the called terminal establish a call connection according to the allocated network resource;

wherein a way of reporting the user's requirement information for the current communication service level in the call request initiated by said calling user is additionally dialing an access number prefix before a called number, or a way of reporting the user's requirement information for the current communication service level in the call request initiated by said calling user is that the user configures the current communication service level by a menu or a button which is set on the terminal and can be used to configure the communication service level, and the terminal reports the requirement information for the current communication service level to the network equipment by an interface signaling on the user-network interface after the first configuration or the change of the current configuration.

8. The method for implementing a business of communication service level based on a calling user request according to claim 7, characterized in that said step 3 includes the following steps:

step 3a, the network equipment on the calling side determines whether a network-network interface between the calling side network and the called side network has an interoperability for the business of communication service level; if yes, the network equipment on the calling side analyzes the requirement information for the current communication service level and utilization status of the network resources, obtains strategy information relevant to the communication service level of the current call according to the analysis result, executes the step 3b and sends the requirement information for the current communication service level to the network equipment on the called side; if no, the network equipment on the calling side doesn't respond to the requirement information for the current communication service level, and the step 5 is executed;

step 3b, the network equipment on the calling side allocates a network-network resource according to the strategy information relevant to the communication service level of the current call, and the step 5 is executed.

9. The method for implementing a business of communication service level based on a calling user request according to claim 8, characterized in that, in said step 3a when the network equipment on the calling side determines that the network-network interface between the calling side network and the called side network hasn't the interoperability for the business of communication service level and/or in said step 3b before the step 5 is executed, the following steps are included:

step a, the network equipment on the called side determines whether a user-network interface on the called side has the capability of providing the communication service level; if yes, the network equipment on the called side analyzes the requirement information for the current communication service level and the utilization status of the network resources, obtains the strategy information relevant to the communication service level of the current call according to the analysis result and executes the next step; if no, the network equipment doesn't respond to the requirement information for the current communication service level, and the step 5 is executed;

step b, the network equipment on the called side allocates a user-network resource for the called side according to the strategy information relevant to the communication service level of the current call, and the step 5 is executed.

10. The method for implementing a business of communication service level based on a calling user request according to claim 7, characterized in that said way of additionally dialing an access number prefix is that the calling user manually inputs the access number prefix one by one before the called number when initiating the call each time.

11. The method for implementing a business of communication service level based on a calling user request according to claim 7, characterized in that said way of additionally dialing an access number prefix is that the user configures the access number needed to be additionally dialed by using a menu or a button which is set on the terminal and can be used to configure the communication service level; when the calling user initiates the call request, the calling terminal detects the configuration of the communication service level; if the configuration needs additionally dialing the access number prefix, then the number prefix is automatically added before the called number when the calling terminal sends the called number.

12. The method for implementing a business of communication service level based on a calling user request according to claim 8, characterized in that in the said step 3a, the way that the network equipment on the calling side sends the requirement information for the current communication service level to the network equipment on the called side is additionally dialing an access number prefix before the called number, or the network equipment on the calling side sending the requirement information for the communication service level of the current call to the network equipment on the called side by the interface signaling on the network-network interface in the process of call connection.

13. The method for implementing a business of communication service level based on a calling user request according to claim 1, characterized in that the requirement information for the communication service level of the current call is a parameter value in the interface signaling.

* * * * *